Patented Apr. 26, 1938

2,115,612

UNITED STATES PATENT OFFICE 2,115,612

METHOD OF FACING WALLS

James Carruthers Blair-McGuffie, Westminster, England

No Drawing. Application May 3, 1937, Serial No. 140,563. In Great Britain April 2, 1936

8 Claims. (Cl. 91—68)

This invention relates to methods of facing walls whether of brick, stone, breeze blocks or other materials and has for its object to provide an improved method of producing smooth and waterproofed surfaces on walls capable of being colored or otherwise treated for internal or external decoration.

According to the invention a method of facing walls is provided which consists first in applying a succession of coatings each consisting of a cement and sand mixture some or all of said coatings containing a waterproofing substance, secondly in applying by means of a spray to the surface provided by such coatings a coating of cement and other materials and thirdly in impregnating the surface formed by the last mentioned coating with an insoluble precipitate.

In carrying the invention into effect and in the preferred manner, the wall to be treated is first cleaned down and if necessary hacked over to provide a key. The improved facing is then applied in the following manner:—

The first stage consists in the production of a sand cement surfacing which is effected by applying a cement and sand mixture in the form of a slurry to the wall surface. This is followed by the application of three sand cement coatings in which the proportion of sand in each successive coating is gradually increased. The thicknesses of these three coatings are approximately and respectively ¼", ⅜" and ⅛" variable according to circumstances. The slurry and the succeeding coatings may each contain a waterproofing substance this being an invariable ingredient in the third coating for which also a finer grade of sand is employed, preferably one which will pass a sieve having twenty openings per lineal inch. The waterproofing substance may consist, for example, of zinc palmitate. The time periods which elapse between the successive coatings vary according to climatic conditions but each coating after the first is applied before the previous coat is too hard to receive a thumb nail impression.

After the above described coatings have set the second stage in the process commences and consists in the application by spraying on a cementitious composition compounded from cement, calcium hydroxide, puzzuolanic earth, sodium chloride, metallic soap and water, the proportions of the several constituents being variable according to the character of the cement and water employed. In this composition the metallic soap employed is preferably zinc palmitate.

This coating is applied only when the surface of the last sand cement coating is quite dry, the period occupied by the drying process varying with climatic conditions but normally being about seven days. Immediately before the commencement of the second stage in the process the dry surface of the sand cement coating is well brushed to remove dust and is uniformly damped with water.

The third and final stage in the formation of the improved wall facing consists in impregnating the surface formed during the second stage with an insoluble precipitate which is effected by alternate applications of soap and alum solutions, the soap employed being preferably potassium oleate. This final impregnation is applied only when the coating produced by the second stage of the process is quite dry, a condition which is reached in normal weather conditions in about four days. The soap solution is applied by spraying and after it has dried, a process which takes place normally in about twenty four hours, the alum solution is also applied by spraying.

On the completion of the impregnation of the insoluble precipitates and when the surface is dry it is polished by hand or by mechanical means with dry brushes or cloths.

The surface produced by the method above described is white but by the addition of ground colors to the composition applied at the second stage any desired coloring can be produced in the finished wall facing.

Example

*Stage 1.*—The sand cement surfacing is formed by a slurry consisting of 1 part of cement to ½ part of sand by volume.

This is followed by the application of three sand cement coatings in which the proportions increase from 1½ parts of sand to 1 part of cement by volume for the first coating to 2 parts of sand for the second coating and 2½ parts of sand for the third coating.

Zinc palmitate may form an ingredient in the first and second coatings and is an essential ingredient in the third coating being added to the cement in the proportion of 0.4 part by weight to 100 parts by weight of cement.

*Stage 2.*—After the sand cement coatings have dried a composition is applied by spraying and is compounded from ingredients as follows:—

| | Parts by weight |
|---|---|
| Cement | 100 |
| Calcium hydroxide | 5 |
| Puzzuolanic earth | 10 |
| Sodium chloride | 2.5 |
| Zinc palmitate | .06 |
| Water | |

*Stage 3.*—The surface formed during the second stage is impregnated with soap and alum solutions which are both applied by spraying. These solutions have the following compositions:—

5% by weight of soap to water.
1.25% by weight of alum to water.

I claim:

1. The method of facing walls which consists first in applying a succession of coatings each consisting of a cement and sand mixture at least one of said coatings containing a waterproofing substance, secondly in applying by means of a spray to the surface provided by such coatings, after drying, a coating of a cementitious composition containing cement and a metallic soap and thirdly in impregnating the surface formed by the last mentioned cementitious coating, after drying, with an insoluble precipitate.

2. The method of facing walls which consists firstly in the application of a sand cement slurry, secondly in the application of sand cement coatings at least one of which contains a waterproofing substance, thirdly in the application of a cementitious composition containing a metallic soap and finally in impregnating the surface with alternate applications of soap and alum solutions.

3. The method of facing walls which consists firstly in applying a succession of coatings each consisting of a cement and sand mixture, at least one of said coatings containing a waterproofing substance, secondly in applying a cementitious coating consisting of cement, calcium hydroxide, puzzuolanic earth, sodium chloride and a metallic soap and thirdly in impregnating the surface formed by the last mentioned coating with an insoluble precipitate.

4. The method of facing walls according to claim 3 wherein the proportion of sand in the sand cement coatings is progressively increased in each successive coating.

5. The method of facing walls according to claim 3 wherein the waterproofing substance employed is zinc palmitate.

6. The method of facing walls according to claim 3 wherein the final impregnation is effected by alternate applications of potassium oleate and alum solutions.

7. The method of facing walls according to claim 3 wherein the cementitious coating also includes a coloring ingredient.

8. The method of facing walls which consists in the application of a sand and cement slurry, in the application of three sand cement coatings in which the proportion of sand progressively increases, in the inclusion of zinc palmitate as a waterproofing agent in any of said coatings, in the application of a cementitious composition consisting of cement, calcium hydroxide, puzzuolanic earth, sodium chloride and zinc palmitate, in impregnating the surface formed by said composition with alternate applications of potassium oleate and alum solutions and in polishing the finished surface.

JAMES CARRUTHERS BLAIR-McGUFFIE.